US011340630B2

(12) United States Patent
Nageswaran et al.

(10) Patent No.: US 11,340,630 B2
(45) Date of Patent: May 24, 2022

(54) SYSTEMS AND METHODS FOR ROBUST ROBOTIC MAPPING

(71) Applicant: Brain Corporation, San Diego, CA (US)

(72) Inventors: Jayram Moorkanikara Nageswaran, San Diego, CA (US); Oleg Sinyavskiy, San Diego, CA (US); Borja Ibarz Gabardos, La Jolla, CA (US)

(73) Assignee: Brain Corporation, San Diego, CA (US)

( * ) Notice: Subject to any disclaimer, the term of this patent is extended or adjusted under 35 U.S.C. 154(b) by 639 days.

(21) Appl. No.: 15/942,123

(22) Filed: Mar. 30, 2018

(65) Prior Publication Data

US 2019/0302791 A1    Oct. 3, 2019

(51) Int. Cl.
*G05D 1/02* (2020.01)
*G05D 1/00* (2006.01)

(52) U.S. Cl.
CPC ......... *G05D 1/0238* (2013.01); *G05D 1/0088* (2013.01); *G05D 1/0274* (2013.01)

(58) Field of Classification Search
CPC .. G05D 1/0238; G05D 1/0088; G05D 1/0274; G05D 1/0246; G05D 1/0255; G06T 2207/30261; G06T 2207/20021; G06K 9/4604; B25J 9/1697; B60W 2420/42; H04N 13/128; H04N 13/25; H04N 5/3765
See application file for complete search history.

(56) References Cited

U.S. PATENT DOCUMENTS

| | | | | |
|---|---|---|---|---|
| 7,188,042 B2 * | 3/2007 | Havens | ..................... | G01D 9/00 702/116 |
| 9,661,308 B1 * | 5/2017 | Wang | ................... | H04N 13/261 |
| 2005/0156562 A1 * | 7/2005 | Cohen | ................ | H02J 7/00714 320/107 |
| 2009/0141938 A1 * | 6/2009 | Lim | .................... | G06K 9/00664 382/103 |
| 2015/0151646 A1 * | 6/2015 | Noiri | ....................... | B60L 53/36 701/22 |
| 2017/0116487 A1 * | 4/2017 | Yamazaki | ............... | G06T 7/285 |
| 2017/0197311 A1 * | 7/2017 | Garcia | ................... | G01S 15/931 |
| 2017/0208274 A1 * | 7/2017 | Kelly | .................... | H04N 5/2355 |
| 2017/0329347 A1 * | 11/2017 | Passot | .................. | G05D 1/0088 |

* cited by examiner

*Primary Examiner* — Jason Holloway
(74) *Attorney, Agent, or Firm* — Reed Smith LLP; Sidharth Kapoor

(57) ABSTRACT

Systems and methods for robotic mapping are disclosed. In some example implementations, an automated device can travel in an environment. From travelling in the environment, the automated device can create a graph comprising a plurality of nodes, wherein each node corresponds to a scan taken by one or more sensors of the automated device at a location in the environment. In some example embodiments, the automated device can reevaluate its travel along a desired path if it encounters objects or obstructions along its path, whether those objects or obstructions are present in the front, rare or side of the automated device. In some example embodiments, the automated device uses a timestamp methodology to maneuver around its environment that provides faster processing and less usage of memory space.

14 Claims, 7 Drawing Sheets

FRONT

| $t_{11}$ | $t_{12}$ | X $t_{13}$ | $t_{14}$ | $t_{15}$ | $t_{16}$ | $t_{17}$ | X $t_{18}$ | $t_{19}$ | $t_{110}$ |
|---|---|---|---|---|---|---|---|---|---|
| $t_{21}$ | $t_{22}$ | $t_{23}$ | $t_{24}$ | $t_{25}$ | $t_{26}$ | $t_{27}$ | $t_{28}$ | $t_{29}$ | $t_{210}$ |
| $t_{31}$ | $t_{32}$ | $t_{33}$ | $t_{34}$ | $t_{35}$ | $t_{36}$ | $t_{37}$ | $t_{38}$ | $t_{39}$ | $t_{310}$ |
| $t_{41}$ | $t_{42}$ | $t_{43}$ | ● $t_{44}$ | $t_{45}$ | ● $t_{46}$ | $t_{47}$ | $t_{48}$ | $t_{49}$ | $t_{410}$ |
| $t_{51}$ | X $t_{52}$ | $t_{53}$ | $t_{54}$ | $t_{55}$ | $t_{56}$ | $t_{57}$ | $t_{58}$ | X $t_{59}$ | $t_{510}$ |
| $t_{61}$ | X $t_{62}$ | X $t_{63}$ | $t_{64}$ | $t_{65}$ | $t_{66}$ | $t_{67}$ | X $t_{68}$ | X $t_{69}$ | $t_{610}$ |
| $t_{71}$ | X $t_{72}$ | X $t_{73}$ | $t_{74}$ | $t_{75}$ | $t_{76}$ | $t_{77}$ | X $t_{78}$ | X $t_{79}$ | X $t_{710}$ |
| X $t_{81}$ | $t_{82}$ | $t_{83}$ | $t_{84}$ | $t_{85}$ | $t_{86}$ | $t_{87}$ | $t_{88}$ | X $t_{89}$ | X $t_{810}$ |
| X $t_{91}$ | $t_{92}$ | $t_{93}$ | $t_{94}$ | $t_{95}$ | $t_{96}$ | $t_{97}$ | $t_{98}$ | $t_{99}$ | X $t_{910}$ |
| $t_{101}$ | $t_{102}$ | $t_{103}$ | $t_{104}$ | $t_{105}$ | $t_{106}$ | $t_{107}$ | $t_{108}$ | $t_{109}$ | $t_{1010}$ |

REAR

FIGURE 4

SYSTEMS AND METHODS FOR ROBUST ROBOTIC MAPPING

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNOLOGICAL FIELD

The present application generally relates to providing accurate route and/or environment mapping by providing computational efficiency performed by an autonomous device traveling along a path, which can reduce consumption of processing power, energy, and/or other resources in navigation.

BACKGROUND

In some cases, automated devices such as a robot map an environment. These maps enable the robot to navigate autonomously. As the robot maps its environment, it relies on its senses (e.g., using sensors) to detect features of the environment and remember those features for later reference. However, mapping can be a slow and difficult process due to, among other things, environmental noise, sensor noise and inaccuracy, significant processing time and great amount of memory usage in processing.

Inaccuracies in mapping can cause a robot to get lost during navigation or become unable to navigate an environment at all. In some cases, mapping issues can cause a robot to collide with objects or people in an environment, or fail to accomplish the objective the robot was tasked to do. As a result, there is need in the art to develop systems and methods that can correct for inaccuracies in mapping, provide faster processing and use less memory space during processing of data analyzed by processor(s).

SUMMARY OF EXAMPLE EMBODIMENTS

The foregoing needs are satisfied by the present disclosure, which provides for, inter alia, apparatus and methods for mapping in autonomous navigation. Example implementations described herein have innovative features, no single one of which is indispensable or solely responsible for their desirable attributes. Without limiting the scope of the claims, some of the advantageous features will now be summarized.

Example embodiments of the present disclosure are directed towards a system for maneuvering a device along a path. The system comprising a memory having computer readable instructions stored thereon; and at least one processor configured to execute the computer readable instructions to, receive a first signal from a first sensor of one or more sensors upon detection of one or more objects by the first sensor, the one or more objects being in a field of view of the first sensor, each one of the one or more objects corresponding to a respective pixel on a map, associate the respective pixel corresponding to each one of the one or more objects with a timestamp, the timestamp including a ticker, initiate the ticker for the respective pixel upon receiving the first signal, and output a second signal to a second sensor of the one or more sensors after the ticker equals a desired threshold value, the second signal corresponding controlling movement of the device along the path According to example embodiments of the present disclosure, the processor is also configured to associate the timestamp with the respective pixel such that a first timestamp associated with a first pixel is different from a second timestamp associated with a second pixel; output a third signal to the first sensor prior to the output of the second signal to the second sensor; and receive a fourth signal from the first sensor based on the third signal, the fourth signal corresponds to detection of the one or more objects by the first sensor. Further, the processor is also further configured to clear the ticker for the corresponding respective pixel based on the detection of the one or more objects by the first sensor, and reinitiate the ticker for the corresponding respective pixel prior to the output of the second signal to the second sensor.

According to example embodiments of the present disclosure, the processor is further configured to output a third signal to the second sensor if the ticker does not equal the desired threshold value, the third signal corresponds to controlling movement of the device along the path; and output the second signal to the second sensor prior to the initiating of the ticker if the first sensor does not transmit the first signal corresponding to detection of the one or more objects in the field of view of the first sensor. The field of view of the first sensor includes at least one of a right side of the device, a left side of the device, a bottom-right side of the device, and a bottom-left side of the device.

The example embodiments disclosed herein can be performed as a method and/or by a non-transitory computer readable medium. A non-transitory computer-readable storage apparatus is disclosed. In one embodiment, the non-transitory computer-readable storage apparatus has a plurality of instructions stored thereon, the instructions being executable by a processing apparatus to operate a robot. The instructions are configured to, when executed by the processing apparatus, cause a sensor to generate scans of an environment at a plurality of nodes, wherein each node of the plurality is associated with a location; create a graph of the plurality of nodes based on the generated scans; determine extended scan groups based at least in part from scans associated with groups of the plurality of nodes; and perform scan matching on the extended scan groups.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 4 is a diagram of the pixels of a map being constructed from scans in accordance to another example embodiment of the present disclosure.

Figure 1:
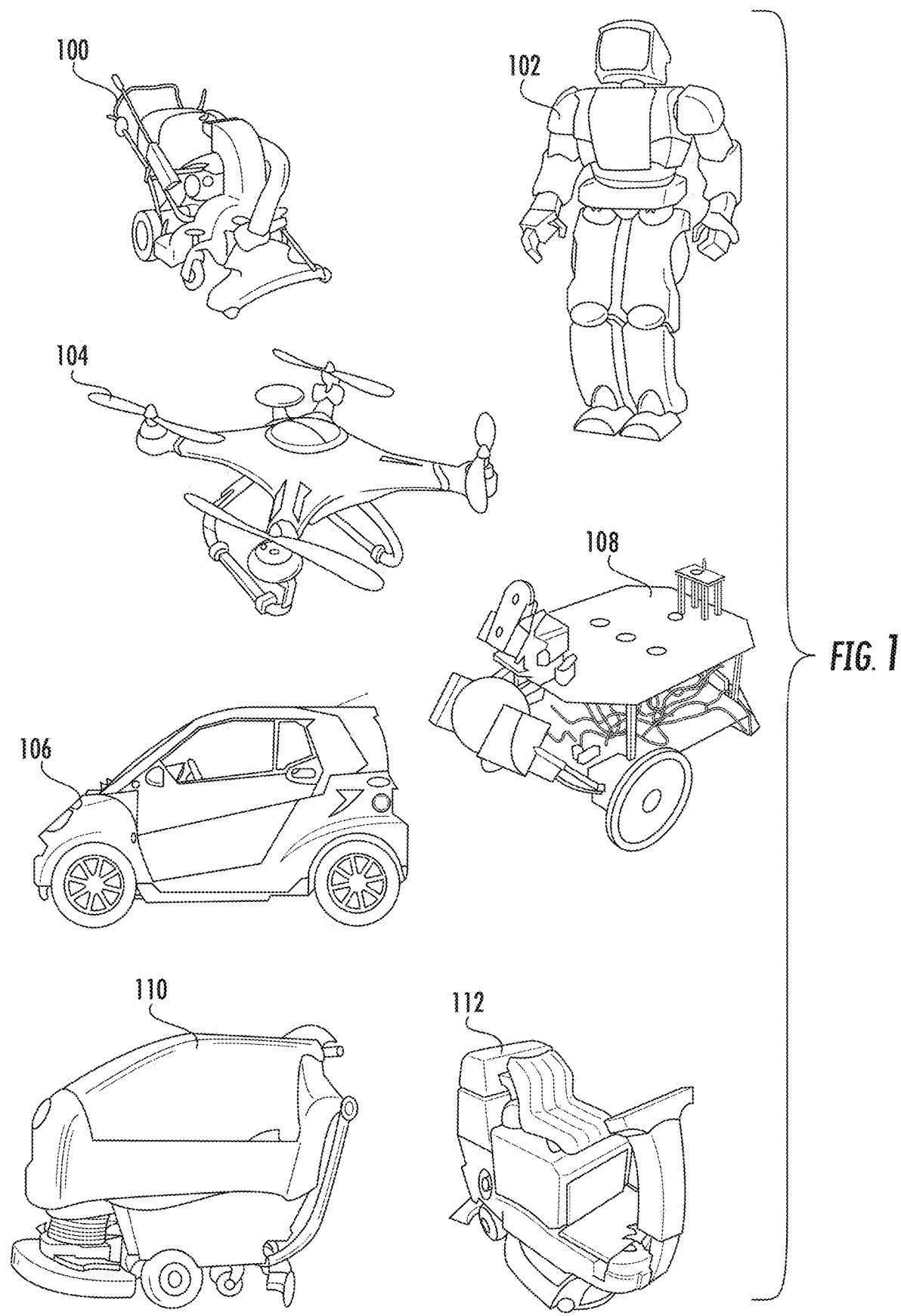
FIG. 1 illustrates various views of example embodiments of various body forms for a device in accordance with principles and inventive concepts of the present disclosure.

All Figures disclosed herein are © Copyright 2018 Brain Corporation. All rights reserved.

DETAILED DESCRIPTION OF EXAMPLE EMBODIMENTS

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein can be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems and methods for mapping of an environment by one or more automated devices. As used herein, automated devices, for example a robot, can include mechanical or virtual entities configured to carry out complex series of actions automatically. In some cases, automated device can be machines that are guided by computer programs or electronic circuitry. In some cases, automated device can include electro-mechanical components that are configured for navigation, where the automated device can move from one location to another. Such navigating automated devices can take various forms and shapes, such as including but not limited to autonomous cars, floor cleaners, rovers, drones, carts, and the like. As referred to herein, floor cleaners can include floor cleaners that are manually controlled (e.g., driven or remote control) and/or autonomous (e.g., using little to no user control). For example, floor cleaners can include floor scrubbers that a janitor, custodian, or other person operates and/or robotic floor scrubbers that autonomously navigate and/or clean an environment. Similarly, floor cleaners can also include vacuums, steamers, buffers, mop, polishers, sweepers, etc.

Detailed descriptions of the various implementations and variants of the system and methods of the disclosure are now provided. While many examples discussed herein are in the context of robotic floor cleaners, it will be appreciated that the described systems and methods contained herein can be used in other autonomous devices. Myriad other example implementations or uses for the technology described herein would be readily envisioned by those having ordinary skill in the art, given the contents of the present disclosure.

Referring to FIG. 1 various forms of the autonomous devices are shown. That is, FIG. 1 illustrates various views of different body forms for the autonomous devices in accordance with principles of the present disclosure. These non-limiting example embodiments are meant to further illustrate the variety of body forms, but not to restrict the autonomous devices described herein to any particular body form.

For example, still referring to FIG. 1, body form 100 illustrates an example where the robot is a stand-up shop vacuum. Body form 102 illustrates an example where the robot is a humanoid robot having an appearance substantially similar to a human body. Body form 104 illustrates an example where the robot is a drone having propellers. Body form 106 illustrates an example where the robot has a vehicle shape including wheels and a passenger cabin. Body form 108 illustrates an example where the robot is a rover. Body form 110 can be an example where the robot is a motorized floor scrubber. Body form 112 can be a motorized floor scrubber having a seat, pedals, and a steering wheel, where a user can drive body form 112 like a vehicle as body form 112 cleans. Other body forms are further contemplated, including industrial machines that can be robotized, such as forklifts, tugs, boats, planes, etc.

Advantageously, the systems and methods of this disclosure at least provide computational efficiency by autonomous devices, which can reduce consumption of processing power, energy, and/or other resources during navigation.

During navigation, many current autonomous devices that can autonomously navigate are programmed to navigate routes and/or paths to goals or desired end points. In order to navigate these routes and/or paths, these autonomous devices can create maps, which can sometimes be referred to as a global solution in that the maps identify one or more portions of the environment beyond what the autonomous devices can directly observe with its sensors at a point in time. These autonomous devices generate maps, and their relationship to the environment along routes, using localized detection in a small area around itself (e.g., in the order of a few meters), where the autonomous devices can determine obstacles and/or other features detected by its one or more sensors. When navigating autonomously, the autonomous devices can then utilize both the global solution and localized detection of objects to avoid collisions and/or reach its goal.

By way of illustration, during a training mode, an autonomous device (e.g., a floor cleaner) can be programmed by demonstration. In the example of a floor cleaner, during the training mode, an operator can control the robot along a desired route or path in a desired environment. Accordingly, the autonomous device can generate a map, documenting its location (e.g., place on the global map and/or pose relative to features of the environment) while a user or operator controls the autonomous device in the training mode. The autonomous device is configured to generate the map using odometry and its one or more sensors (e.g., scans by a Light Detecting and Ranging ("LIDAR") sensor and/or any other sensor that is described in this disclosure). Based on the training of the autonomous device during the training mode, the autonomous device can then subsequently navigate the route autonomously, e.g., with little to no operator control. This is referred to as a non-training mode as the autonomous device operates autonomously without any further input from the operator.

A challenge for the autonomous devices in this illustration is constructing an accurate map that the autonomous devices can utilize to autonomously navigate the route after demonstration. The demonstration process can include complex sets of movements and actions (e.g., turning, stopping, parking, turning on and off blinkers and other signals, lifting and dropping brushes, turning off and on water flow, turning off and on vacuums, etc.) associated with particular poses and/or trajectories, as well as identification of objects. During the demonstration, the autonomous devices mapping may not be perfectly accurate (e.g., subject to drift, noise, and/or error), and the autonomous devices may need to determine how the map should have appeared to accurately reflect the true state of the environment.

Figure 2A:
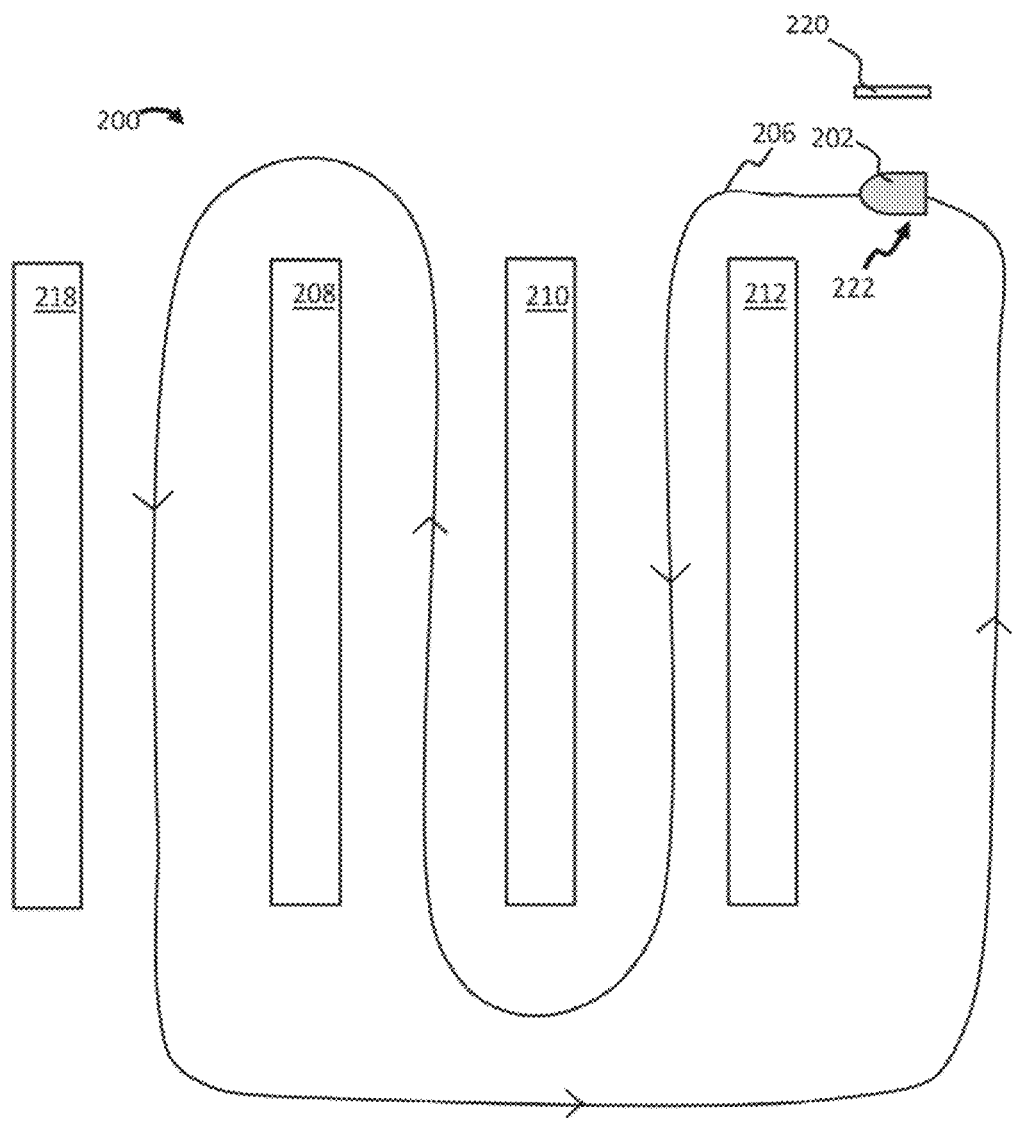
FIG. 2A illustrates an example embodiment of a desired path traveled by the device in a given environment.

Referring now to FIG. 2A, an example embodiment of a desired path traveled by the autonomous device in a given environment is illustrated. Hereinafter, the term "autonomous device" is synonymous with "device" and "robot." As such, these terms may be used interchangeably to describe the same concept or physical feature. FIG. 2A illustrates a robot 202 in an environment 200. In this environment 200, the robot 200 is shown traveling along a path or route 206 while it is mapping it is surrounding in the environment. Robot 202 can be any robot described in this disclosure as set forth above in reference to FIG. 1. Environment 200 can be the space in which the robot 202 navigates. For example, environment 200 can be a store, warehouse, office building, home, storage facility, etc. One or more of objects 208, 210, 212, 218 can be, including but not limited to, shelves, displays, objects, items, people, animals, or any other entity or thing that may be on the floor or otherwise impede the ability of robot 202 to navigate through environment 200. As such, route 206 can be the cleaning path traveled by robot 202. Route 206 can follow a path that weaves between objects 208, 210, 212, and 218 as illustrated in example route 206. For example, where objects 208, 210, 212, and 218 are shelves in a store, robot 202 can go along the aisles of the store and clean the floors of the aisles.

However, other routes are also contemplated, such as, without limitation, weaving back and forth along open floor areas and/or any cleaning path a user could use to clean the floor (e.g., if the user is manually operating a floor cleaner). Accordingly, route 206 is meant merely as illustrative examples and can appear differently as illustrated. Also, as illustrated, one example of environment 200 is shown, however, it should be appreciated that environment 200 can take on any number of forms and arrangements (e.g., of any size, configuration, and/or layout of a room and/or building) and is not limited by the example illustrations of this disclosure.

Still referring to FIG. 2A, in route 206, robot 202 may begin at the initial location 222, which can be a starting point/location of robot 202. In some cases, a home locator 220 can be positioned near, substantially near, and/or at the initial location 222. For example, home locator 220 can be positioned adjacent to initial location 222, or be within the range of at least one sensor of robot 202 such that a sensor of robot 202 can detect home locator 220 from initial location 222. The operator can then demonstrate route 206 to robot 202 until robot 202 reaches an end location, where the operator can stop operating robot 202. The end location can be designated by the user or operator and/or determined by robot 202. In some cases, for example, the end location may be the location in route 206 after which robot 202 has cleaned the desired area of a floor. As previously described, route 206 can be a closed loop or an open loop. By way of illustrative example, an end location can be a location for storage for robot 202, such as a temporary parking spot, storage room/closet, and the like. In some cases, the end location can be the point where a user training and/or programming tasks for robot 202. In some cases, the end location can be the same and/or substantially similar as initial location 222. For example, robot 202 can detect a return to a position that is the same and/or substantially similar to initial location 222 by detecting home locator 220.

For example, robot 202 may associate certain actions (e.g., turning, turning on/off water, spraying water, turning on/off vacuums, moving vacuum hose positions, gesticulating an arm, raising/lowering a lift, moving a sensor, turning on/off a sensor, etc.) with particular positions and/or trajectories (e.g., while moving in a certain direction or in a particular sequence along route 206) along the demonstrated route. In the context of floor cleaners, such association may be desirable when only some areas of the floor are to be cleaned but not others and/or in some trajectories. In such cases, robot 202 can turn on a cleaning system in areas where a user demonstrated for robot 202 to clean, and turn off the cleaning system otherwise.

Figure 2B:
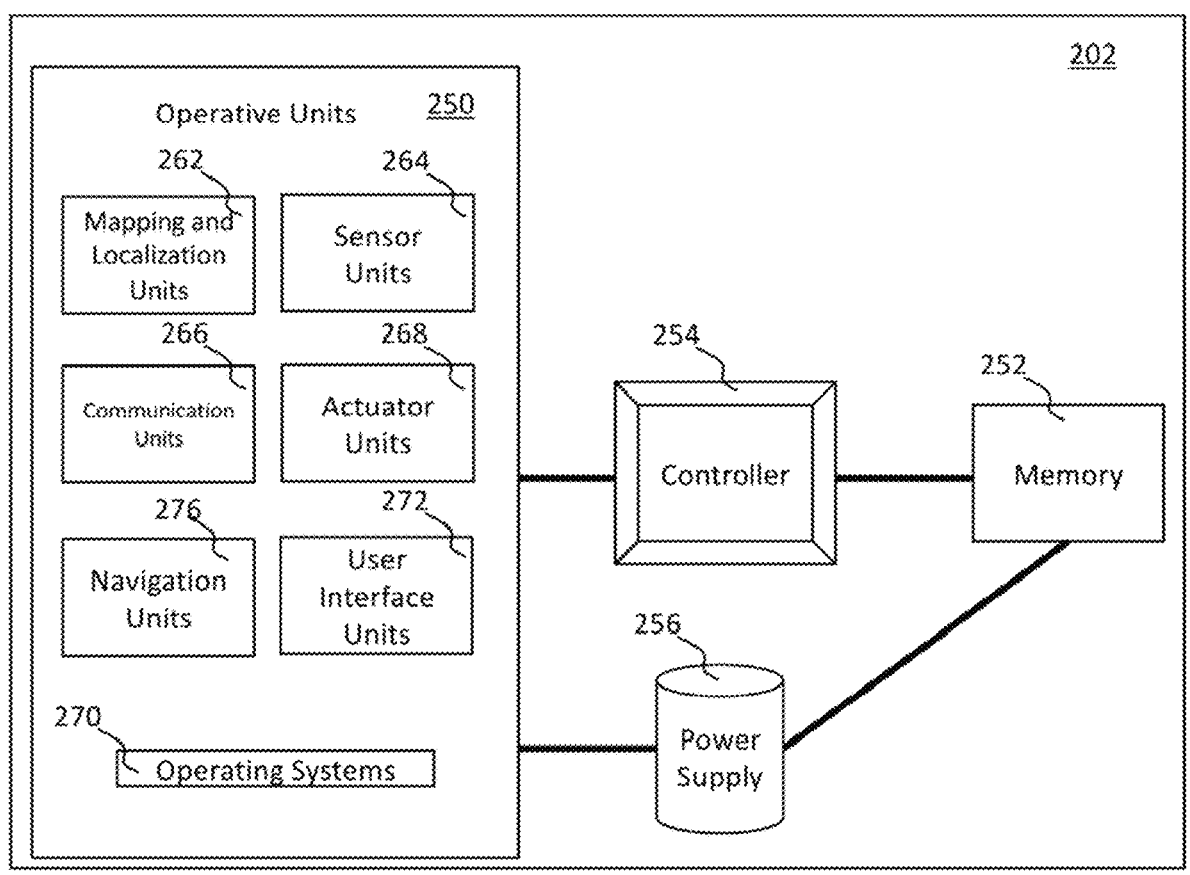
FIG. 2B is a diagram of an overall view of the device and components therein.

Referring to FIG. 2B is a diagram of an overall view of the autonomous device and components therein. That is, FIG. 2B illustrates an example embodiment of a functional block diagram of the autonomous device 202. Again, reference to "autonomous device" is synonymous with "device" and "robot." As illustrated in FIG. 2B, robot 202 includes a controller 254, a memory 252, a power supply 256, and operative units 250. Each of these aforementioned components can be operatively and/or communicatively coupled to each other and each other's components and/or subcomponents.

The controller 254 controls various operations performed by the robot 202. Although a specific implementation is illustrated in FIG. 2B, the architecture may be varied in certain implementations as would be readily apparent to one of ordinary skill given the contents of the present disclosure.

The controller 254 may include one or more processors (e.g., microprocessors and digital processors) and other peripherals. As used herein, the terms processor, microprocessor, and digital processor can include any type of digital processing devices such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die, or distributed across multiple components. The controller 254 may be operatively and/or communicatively coupled to the memory 252.

Throughout this disclosure, reference may be made to various controllers and/or processors. In some implementations, a single controller (e.g., controller 254) can serve as the various controllers and/or processors described. In other implementations, different controllers and/or processors can be used, such as controllers and/or processors used particularly for, and/or as part of, one or more of operative units 250 (described below). Controller 254 can send and/or receive signals, such as power signals, control signals, sensor signals, interrogatory signals, status signals, data signals, electrical signals and/or any other desirable signals, including discrete and analog signals to operative units 250. Controller 254 can coordinate and/or manage operative units 250, and/or set timings (e.g., synchronously or asynchronously), turn on/off, control power budgets, receive/send network instructions and/or updates, update firmware, send interrogatory signals, receive and/or send statuses, and/or perform any operations for running features of the robot 202.

Still referring to FIG. 2, memory 252 can include any type of integrated circuit or other storage device adapted for storing digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output RAM ("EDO"), fast page mode ("FPM") RAM, reduced latency DRAM ("RLDRAM"), static RAM ("SRAM"), flash memory (e.g., NAND/NOR), memristor memory, pseudostatic RAM ("PSRAM"), etc.

Memory 252 can provide instructions and data to the controller 254. For example, memory 252 can be a non-transitory, computer-readable storage medium having a plurality of instructions stored thereon, the instructions being executable by a processing apparatus (e.g., controller 254) to operate the robot 202. In some cases, the processing apparatus can be configured to execute the computer-readable instructions to perform various methods, features, and/or functionality described in this disclosure. The controller 254 can perform logical and arithmetic operations based on program instructions stored within the memory 252.

Operative units 250, as shown in FIG. 2B, can be coupled to the controller 254, or any other controller, in order to perform the various operations described in this disclosure. The operative units 250 include one or more modules. One or more of the modules in operative units 250 can be included in some example embodiments and/or all example embodiments.

Operative units 250 can include various units that perform functions for the robot 202. For example, units of operative units 250 can include mapping and localization units 262, sensor units 264, actuator units 268, communication units 266, navigation units 276, and user interface units 272. Operative units 250 can also comprise other units that provide the various functionality of robot 202. In some cases, the units of operative units 250 can be instantiated in software or hardware and/or both software and hardware. For example, in some cases, units of operative units 250 can comprise computer-implemented instructions executed by a controller. In some cases, units of operative units 250 can comprise hardcoded logic. In some cases, units of operative units 250 can comprise both computer-implemented instructions executed by a controller and hardcoded logic. Where operative units 250 are implemented at least in part in software, operative units 250 can include units/modules of code configured to provide one or more functionalities. As such, the term "units" as used herein is not a generic non-structural placeholder per se. Instead, in light of the disclosure of example embodiments disclosed herein, one skilled in the art would be appreciate that the units included in the operative units 250 can be either software or hardware and/or both software and hardware.

In some example embodiments, sensor units 264 may comprise systems that may detect characteristics within and/or around the robot 202. Sensor units 264 can include sensors that are internal or external to the robot 202, and/or have components that are partially internal and/or partially external. Sensors unit 264 can include exteroceptive sensors such as sonar, Light Detection and Ranging (LIDAR) sensor, radars, lasers, video cameras (e.g., video data), depth sensor, infrared cameras, three-dimensional (3D) sensors, and/or 3D cameras. Sensor units 264 can also include proprioceptive sensors, such as accelerometers, inertial measurement units, odometers, gyroscopes, speedometers, and/or the like. In some implementations, sensor units 264 can collect raw measurements (e.g., currents, voltages, resistances gate logic, etc.) and/or transformed measurements (e.g., distances, angles, detected points in obstacles, etc.).

Visual data processing the features that may be detected in the sensory output may comprise one or more of representations (e.g., representations of objects, corner, edges, patches of texture, color, brightness, and/or other patterns that may be present in visual output). Sensors pertaining to accelerometers, inertial measurement units, odometers, gyroscopes, speedometers, and/or the like, provide information such as motor torque, motor position, motor load, battery current draw, battery voltage, position of actuators and/or controllable elements (e.g., rotor blade, rudder, wheel), and/or other parameters).

Still referring to FIG. 2B, mapping and localization units 262 can include systems and methods that can computationally construct and update maps of an environment 200 and/or routes 206 as the robot 202 navigates the environment 200. By way of illustrative example, mapping and localization units 262 can map environment 200 and localize the robot 202 (e.g., find the position and/or pose) in a map at one or more points in time. At the same time, mapping and localization units 262 can record a demonstrated route in a map.

Mapping and localization units 262 can also receive sensor data from sensor units 264 to localize robot 202 in a map. In some implementations, mapping and localization units 262 can include localization systems and methods that allow robot 202 to localize itself in the coordinates of a map. As will be described further in this disclosure, mapping and localization units 262 can also process measurements taken by robot 202, such as by generating a graph and/or map.

Still referring to FIG. 2B, communication units 266 can include one or more receivers, transmitters, and/or transceivers. Communication units 266 can be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

As used herein, network interfaces can include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/300 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi can include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

Further, the communication units 266 can also be configured to send/receive a transmission protocol over wired connections, such as any cable that has a signal line and ground. For example, such cables can include Ethernet cables, coaxial cables, Universal Serial Bus ("USB"), FireWire, and/or any connection known in the art. Such protocols can be used by communication units 266 to communicate to external systems, such as computers, smart phones, tablets, data capture systems, mobile telecommunications networks, clouds, servers, or the like. Communication units 266 can be configured to send and receive signals comprising of numbers, letters, alphanumeric characters, and/or symbols. In some cases, signals can be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communication units 266 can be configured to send and receive statuses, commands, and other data/information. For example, communication units 266 can communicate with a user controller to allow the user to control robot 202. Communication units 266 can communicate with a server/network in order to allow robot 202 to send data, statuses, commands, and other communications to the server. The server can also be communicatively coupled to computer(s) and/or device(s) that can be used to monitor and/or control robot 202 remotely. Communication units 266 can also receive updates (e.g., firmware or data updates), data, statuses, commands, and other communications from a server for robot 202 and/or its operative units 250.

In some example embodiments, one or more of operative units 250 may be instantiated remotely from robot 202. For example, mapping and localization units 262, may be located in a cloud and/or connected to robot 202 through communication units 266. Connections can be direct and/or through a server and/or network. Accordingly, implementations of the functionality of this disclosure should also be understood to include remote interactions where data can be transferred using communication units 266, and one or more portions of processes can be completed remotely.

Still referring to FIG. 2B, actuator units 268 can include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators can actuate wheels or other displacement enabling drivers (e.g., mechanical legs, jet engines, propellers, hydraulics, etc.). For example, actuator units 268 can allow robot 202 to move and/or navigate through environment 200 and/or any other environment. In some cases, actuator units 268 can include actuators configured for actions and/or action-specific tasks, such as mobilizing brushes for floor cleaning, moving (e.g., moving up, down, left, right, forward, back) squeegees, turning on/off water, spraying water, turning on/off vacuums, moving vacuum hose positions, gesticulating an arm, raising/lowering a lift, turning a camera and/or any sensor of sensor units 264, and/or any movement desired for robot 202 to perform an action.

In some example embodiments, user interface units 272 can be configured to enable a user or operator to interact with robot 202. For example, user interface units 272 can include touch panels, buttons, keypads/keyboards, ports (e.g., USB, Digital Visual Interface ("DVI"), Display Port, E-Sata, Firewire, PS/2, Serial, video graphics array ("VGA"), Small Computer System Interface ("SCSI"), audioport, High-Definition Multimedia Interface ("HDMI"), Personal Computer Memory Card International Association ("PCMCIA") ports, memory card ports (e.g., SD and miniSD), and/or ports for computer-readable media), mice, rollerballs, consoles, vibrators, audio transducers, and/or any interface for a user to input and/or receive data and/or commands, whether coupled wirelessly or through wires (including, without limitation, any of the wireless or wired connections described in this disclosure, such as with reference to communication units 266).

User interface units 272 can include a display, such as, without limitation, Liquid Crystal Display ("LCDs"), Light-emitting Diode ("LED") displays, LED LCD displays, In-Plane Switching ("IPSs"), cathode ray tubes, plasma displays, High Definition ("HD") panels, 4K displays, retina displays, organic LED displays, touchscreens, surfaces, canvases, and/or any displays, televisions, monitors, panels, screens, and/or devices known in the art for visual presentation. In some implementations, user interface units 272 can be positioned on the body of robot 202. In some implementations, user interface units 272 can be positioned away from the body of robot 202, but can be communicatively coupled to robot 202 (e.g., via communication units 266) directly or indirectly (e.g., through a network or a cloud).

In some example embodiments, navigation units 276 can include components and/or software configured to provide directional instructions for robot 202 to navigate. Navigation units 276 can process maps and localization information generated by mapping and localization units 262, sensor data from sensor units 264, and/or other operative units 250. For example, navigation units 276 can receive a mpa from mapping and localization units 262. Navigation units 276 can also receive localization information from mapping and localization units 262, which can be indicative at least in part of the location of robot 202 within the map, including a route. Navigation units 276 can also receive sensor data from sensor units 264 which can be indicative at least in part of objects around robot 202. Using one or more of the map, location, and sensor data, navigation units 276 can instruct robot 202 where to navigate (e.g., go forward, left, right, back, and/or any other direction).

Further, navigation units 276 can also implement actions and/or action-specific tasks, such as mobilizing brushes for floor cleaning, moving (e.g., moving up, down, left, right, forward, back) squeegees, turning on/off water, spraying water, turning on/off vacuums, moving vacuum hose positions, gesticulating an arm, raising/lowering a lift, turning a camera and/or any sensor of sensor units 264, and/or any action taken by robot 202. In some cases, such actions and/or action-specific tasks can be indicated in a map and be executed by actuator units 268.

Still referring to FIG. 2B, power supply 256 can include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries can be rechargeable, such as wirelessly (e.g., by a resonant circuit and/or a resonant tank circuit) and/or by plugging into an external power source. Power supply 256 can also be any supplier of energy, including wall sockets and electronic devices that convert solar, wind, water, nuclear, hydrogen, gasoline, natural gas, fossil fuels, mechanical energy, steam, and/or any power source into electricity.

In some example embodiments, operating system 270 can be configured to manage memory 252, controller 254, power supply 256, modules in operative units 250, and/or any software, hardware and/or features of robot 202. For example, and without limitation, operating system 270 can include device drivers to manage hardware resources for robot 202. One skilled in the art would appreciate that the aforementioned different components may be arranged in a unique and specialized manner that aids and promotes in functionality of the controller such that the controller may process and execute algorithm efficiently.

As previously mentioned, any of the aforementioned components of robot 202 can be instantiated in software and/or hardware. For example, a unit/module can be a piece of hardware and/or a piece of code run on a computer. Accordingly, the term "unit" in itself is not a generic non-structural placeholder. Moreover, one skilled in the art would appreciate that the aforementioned different components are arranged in a unique and special manner that aids and promotes in functionality of the controller and/or processor such that the controller and/or processor may process and execute algorithm efficiently.

Figure 3:
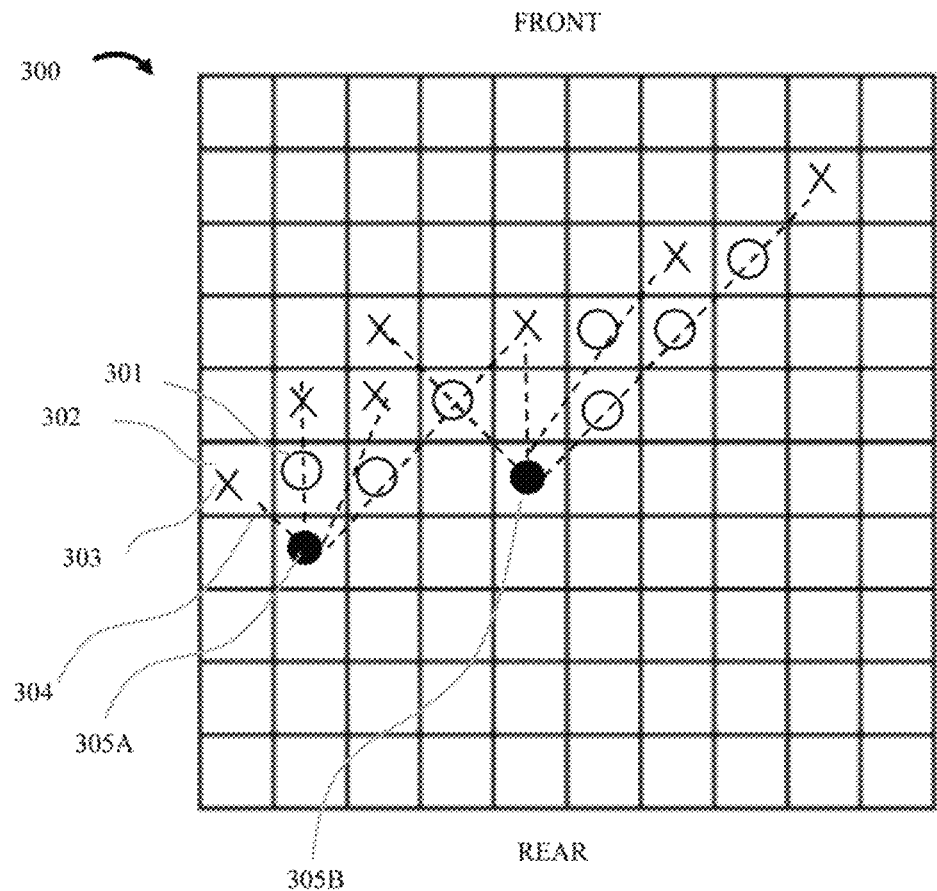
FIG. 3 is a diagram of the pixels of a map being constructed from scans in accordance to one example embodiment of the present disclosure.

Next, with respect to FIG. 3, a diagram of a map is represented, wherein the pixels of a map are constructed from scans in accordance with example embodiments of the present disclosure. By way of illustration, matrix 300 comprises cells that correspond to locations on a map. The matrix 300 has a front end and a rear end as illustrated in FIG. 3. In some cases, each cell can correspond to a pixel. Nodes 305A and 305B in cells in matrix 300 are indicative at least in part of the relative location of Nodes 305A and 305B. Nodes 305A and 305B, for example, represent the positioning of one or more sensors on the map. The one or more sensors including, for example, image sensor, video camera sensor, depth sensor, and/or other sensors capable of capturing an image in a field of view of robot 202. The locations can be based on standard units from a reference point and/or coordinate system (e.g., centimeters, meters, and/or any other standard measurement) and/or relative units (e.g., pixels, clicks, and/or any other relative measurement). Nodes 305A and 305B are provided for illustrative purposes.

The positioning, number, and/or spacing of nodes can be dependent on the scans taken by robot 202 as it traversed an environment.

Each scan can provide information indicative at least in part of the relative location of objects around robot 202 at the nodes. In some cases, scans (e.g., scans from a scan LIDAR) can provide measurements to objects. For example, in some cases, ray tracing can be used, wherein the location of objects along rays extending from robot 202 across space can be used to identify the locations and/or orientations of objects. In matrix 300, dotted lines such as line 304 are indicative at least in part of rays. When an object is detected along a ray, the cell, such as cell 302, can be marked. For visual illustration, mark 303 is an "X" indicative at least in part that an object has been detected at the location corresponding to cell 302.

In contrast, where a ray passes through a location with no object, the corresponding cell can be marked with an "O", such as illustrated with mark 301. The cells corresponding to locations that rays have not passed through can have no mark. Other designations are contemplated. A person having ordinary skill in the art would appreciate that cells can be marked in any way desired. Additionally, more information can be associated with each cell, such as by associating each cell to another data structure and/or using a data structure with more dimensions. For example, additional information such as the location of the route by robot 202, performance of actions and/or action-specific tasks, characteristics of an environment (e.g., water, carpet, reflective, and/or any other description), prohibited areas, and/or others can also be associated with one or more cells. Such additional information can be derived from scans (e.g., from sensors of sensor units 264) and/or derived separately and inserted into the map. Such additional information can be added in at this stage and/or later after map construction.

As illustrated in FIG. 3, the rays 304 project outward from nodes 305A and 305B in the front facing direction of robot 202. The robot 202 has a front end and a rear end. In FIG. 3, nodes 305A and 305B project rays 304 along the front facing end of robot 202 such that any objects or obstructions (i.e., mark "X" notated by mark 303) in the path of rays 304 are detected by nodes 305A and 305B.

Accordingly, through the plurality of ray tracings that can be observed from scans, the location of objects seen by robot 202 at various nodes can be mapped. Together, the accumulation of scans from nodes can create the map. In some cases, there can be overlap between scans at nodes. In some cases, such overlapping scans can agree on the positioning of objects. However, in some cases, overlapping scans can disagree and provide conflicting information. In some cases, these can be due in errors in measurements and/or moving objects. Accordingly, probabilities can be assigned to an identified cell.

In some example embodiments, additional processes can be performed on a map and/or graph. For example, in some example embodiments, a state of a pixel can be indicative at least in part of whether robot 202 can navigate through an area. In some example embodiments, certain locations may not have been adequately observed during demonstration, objects in the environment may have moved, and/or there can be uncertainty in measurements. Using user interface units 272, a user or an operator can edit a map and/or graph in order to add additional information. For example, a user can edit a map to identify areas in which robot 202 can traverse and/or areas in which robot 202 cannot traverse.

Robot 202 can learn from the users input. For example, robot 202 can store in memory 252 a library (not shown)

comprising one or more of: (i) original maps and/or graphs, (ii) maps and/or graphs with user input, (iii) other maps and/or graphs. In some cases, the library can contain approximately 1, 5, 10, 100, 300, 10,000, 100,000, 1,000,000, 10,000,000, or any number of maps and/or graphs. In some implementations, the library can be stored in a network (e.g., cloud, server, etc.) and may not be saved within memory 252. The library can be used (e.g., based on machine learning algorithms) to train robot 202 to determine one or more associations between original maps/graphs and maps/graphs with user input. In this way, robot 202 can learn what changes have been made due to user input in the library and make substantially similar changes when it comes across substantially similar scenarios.

In some implementations, robot 202 can also make changes to existing graphs and/or maps during subsequent navigations in an environment. For example, robot 202 can collect additional data and/or scans in a new graph and/or map and use that additional data and/or scans to supplement an existing graph and/or map.

By way of illustration, robot 202 can, in a first period of time, generate a first graph and/or map beginning at a first home locator and traveling along a first route. At a later, second period of time, robot 202 can travel along a substantially similar path to the first route beginning at the first home locator and generating a second graph and/or map thereto, except collecting data (e.g., scans) that were not collected in the first period of time. Advantageously, where robot 202 started at the first home locator in the first period and the second period of time, robot 202 can use its localization to tie scans together from the first graph and/or map and the second graph and/or map. In this way, robot 202 can add additional coverage to the first graph and/or map that was measured in the second graph and/or map, and/or vice versa.

In some implementations, where different home locators are used as beginning points for the first graph and/or map and the second graph and/or map, robot 202 can transform them into a common coordinate system in order to more easily combine scans from each.

Now, referring to FIG. 4, similar to FIG. 3, a diagram representing a "cost map" of a particular region that the device has to travel. The "cost map" shown in FIG. 4 is essentially a combination of two separate maps that are overlapped on top of each other. For example, the two separate maps that are overlapped on each other include a timestamp map and a positioning map that illustrates position or location of robot 202 in a given environment.

It is noted that such cost map is pre-installed or preprogrammed into the device's memory thereby familiarizing robot 202 with its environment. One cost map is represented in FIG. 4; however, one skilled in the art would appreciate that numerous cost map may be installed or preprogrammed into robot 202. The pre-installed or pre-programmed cost map of a particular region provides the base for the device to become accustomed to its surroundings and perform given tasks in this region. It is important to note that the cost map represented in FIG. 4 is a representative non-limiting example of a given region. The cost map of a region can accordingly be reformatted to a specific region of interest. For example, the cost map of FIG. 4 represents a ten by ten (10×10) grid. This is an example non-limiting representation of the cost map, and is not limited to only this configuration. The grid of the cost map can be depicted with numerous rows and columns such that the grid is a representation of "n×n" pixels, wherein "n" is a positive real number greater than one (1).

Unlike the example embodiment disclosed in FIG. 3, wherein the device constructed the pixels on the cost map by continuously scanning the map by "ray tracing" the pixels, as discussed above, the example embodiment of FIG. 4 does not continuously scan the map by ray tracing methodology. Instead, the device in this example embodiment "timestamps" each pixel on the cost map and associates "a ticker value" for each timestamp, whenever a depth sensor recognizes an object in its field of view. Such methodology provides faster processing, less usage of memory space, and quicker post-solution activity, which is directing the device along a travel path without engaging with the objects in its path.

By way of illustration, the cost map or matrix 400 comprises cells that correspond to locations on a map. The matrix 400 has a front end and a rear end as illustrated in FIG. 4. In some cases, each cell can correspond to a pixel. Nodes 402A and 402B in matrix 400 are indicative at least in part of the relative location of Nodes 402A and 402B. Nodes 402A and 402B, for example, represent the positioning of one or more depth sensors on the device. The one or more sensors including, for example, image sensor, video camera sensor, depth sensors, and/or other sensors capable of capturing an image in a field of view of robot 202. The locations can be based on standard units from a reference point and/or coordinate system (e.g., centimeters, meters, and/or any other standard measurement) and/or relative units (e.g., pixels, clicks, and/or any other relative measurement). The position of nodes 402A and 402B are provided for illustrative purposes. The positioning, number, and/or spacing of nodes can be dependent on the scans taken by robot 202 as it traversed an environment.

Nodes 402A and 402B, which may be depth sensors, may be backward facing depth sensors in an example embodiment. By being backward facing, the Nodes 402A and 402B may perceive environment behind the robot 202, similar to a rear view camera or a rear view mirror on a vehicle. In other example embodiments, such depth sensors may also be front facing depth sensors, and accordingly the Nodes 402A and 402 B may perceive the front of robot 202 environment. Instead of ray tracing as noted in previous example embodiment illustrated in FIG. 3, the depth sensors in FIG. 4 embodiment, detect objects along their field of view and associates a timestamp to a particular pixel where the object is detected.

For example, as shown in FIG. 4, a non-limiting embodiment, which represents a "10×10" grid with 10 rows and 10 columns, has a timestamp associated with each pixel 401 on the grid. This represents the timestamp map. That is, the first pixel that is located in the first row and first column has a timestamp associated with it as $t_{11}$; pixel located in the first row, second column, has a timestamp associated with it as $t_{12}$; pixel located in the tenth row, tenth column has a timestamp associated with it as $t_{1010}$; so on and so forth. In other words, each pixel 401 on the map or matrix 400 in the timestamp map has a timestamp associated with it. As noted before, the map or matrix 400 is representative of a region of interest where the device will operate, and which corresponds to the combination of the two different maps (timestamp map and positioning map) that are overlapped with respect to each other. As such, the map or matrix 400 is pre-installed or pre-programmed into the device's memory.

During an operation mode when the device is traveling along a desired path, as robot 202 updates the positioning map with respect to its location or position in the given environment, the Nodes 402A and 402B, which act as the depth sensors, detect objects along the device's path. For example, in an example embodiment where the depth sensors are backward facing sensors, the depth sensors detect objects along their respective field of view. That is, Node 402A detects and identifies objects along it's field of view, and Node 402B detects and identifies objects along it's field of view which is different from the field of view of Node 402A. When an object is detected by the Nodes 402A and 402B, the cell, such as cell or pixel 401, can be marked. For visual illustration, mark 403 is an "X" indicative at least in part that an object has been detected at the location corresponding to cell or pixel 401. As illustrated in FIG. 4, numerous annotations of "X" have been made in the map or matrix 400. These markings, which illustrate detection of an object along a field of view of the depth sensors or Nodes 402A and 402B, are illustrative examples of where the objects are located.

A person having ordinary skill in the art would appreciate that cells can be marked in any way desired. Additionally, more information can be associated with each cell, such as by associating each cell to another data structure and/or using a data structure with more dimensions. For example, additional information such as the location of the route by robot 202, performance of actions and/or action-specific tasks, characteristics of an environment (e.g., water, carpet, reflective, and/or any other description), prohibited areas, and/or others can also be associated with one or more cells. Such additional information can be derived from scans (e.g., from sensors of sensor units 264) and/or derived separately and inserted into the map. Such additional information can be added in at this stage and/or later after map construction.

Still referring to FIG. 4, once the object is detected by the depth sensor or Nodes 402A and 402B, a timestamp with a "ticker value" is associated with that particular pixel 401 where the object is detected. For example, as shown in FIG. 4, an object is detected by Node 402B in the following parts of the matrix 400—row 5, column 2; row 6, columns 2 and 3; row 7, columns 2 and 3; row 8, column 1; and row 9, column 1. Whereas, an object is detected by Node 2A in the following parts of the matrix 400—row 5, column 9; row 6, columns 8 and 9; row 7, columns 8, 9 and 10; row 8, columns 9 and 10; and row 9, column 10. These are non-limiting examples of where the objects are detected by Nodes 402A and 402B. Further, there are additional objects present at row 1, columns 3 and 8; however, these are not detected by Nodes 402A and 402B because Nodes 402A and 402B in this embodiment are backward facing depth sensors. It would be appreciated by one of ordinary skill in the art that if Nodes 402A and 402B were forward facing depth sensors then they would be able to detect the objects present at row 1, columns 3 and 8.

Upon detection of an object "X" by the depth sensors or Nodes 402A and 402B, a timestamp is associated with mark 403. The timestamp includes a "ticker t" that has an initial value of zero (0). Upon associating the timestamp with mark 405, the ticker t starts to increase its value every second until it reaches a desired "threshold value T". The desired threshold value may be for example five (5) seconds, ten (10) seconds, etc. However, the desired threshold value T may be adjusted upward or downward as would be appreciated by one skilled in the art. Further detailed description of processing of object "X," mark 405, along with ticker t and reaching of desired threshold value T while robot 202 is maneuvering along a desired path is discussed below with reference to FIG. 6.

Figure 5:
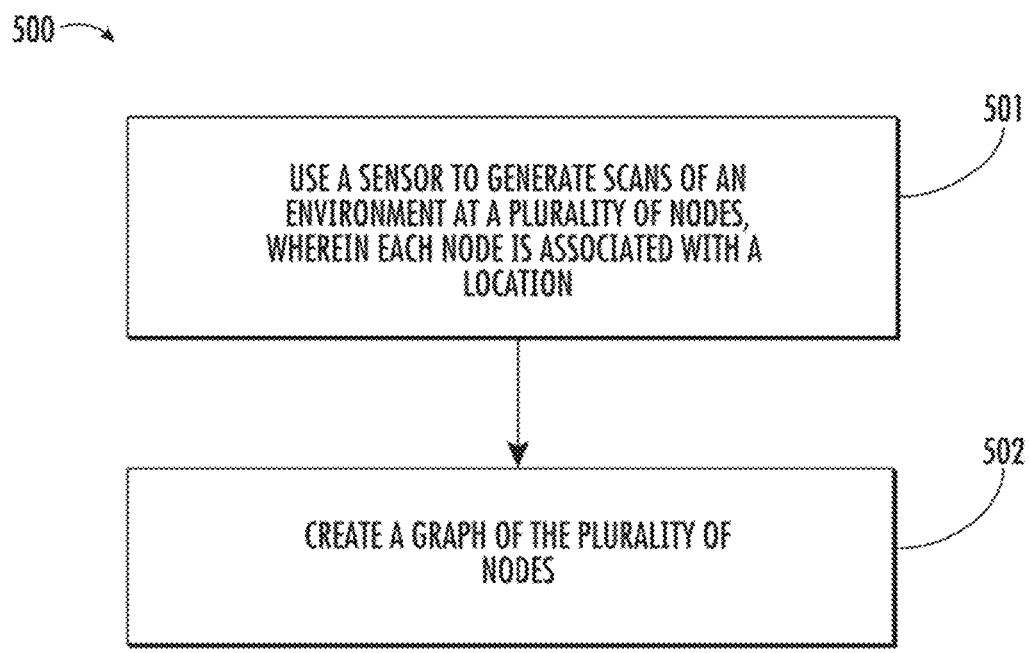
FIG. 5 is a process flow diagram of a method for generating a map by a robot in accordance with example embodiments of the present disclosure.

With reference to FIG. 5, a process flow diagram of an example method 500 for operating a robot in accordance with example implementations is illustrated. Block 501 includes configuring one or more sensors to generate scans of an environment at a plurality of nodes, wherein each node of the plurality is associated with a location. Block 502 includes creating a graph of the plurality of nodes based on the generated scans.

Figure 6:
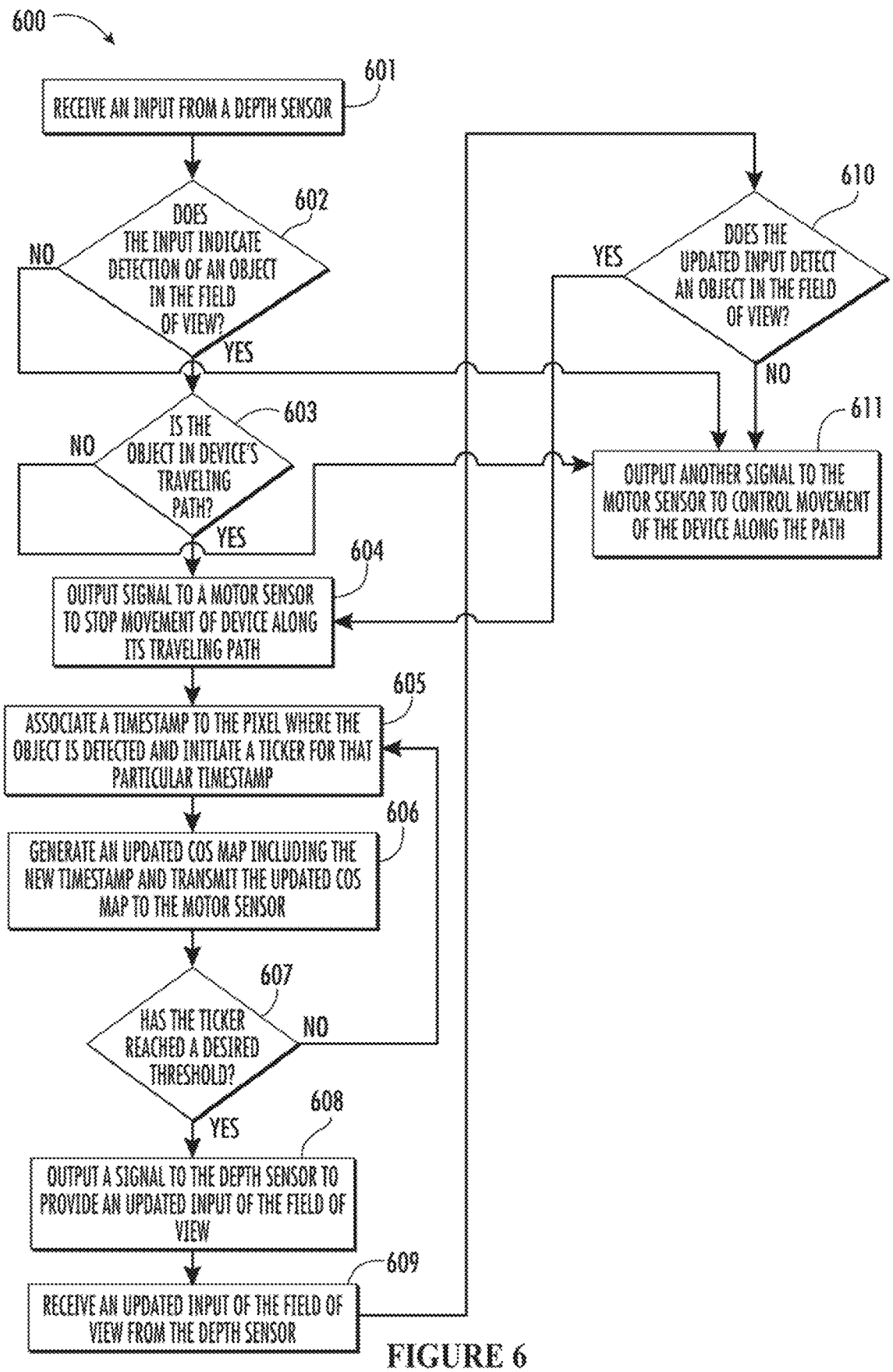
FIG. 6 is a process flow diagram of another method for operating a robot in accordance with another example embodiments of the present disclosure.

Next, with reference to FIG. 6, a specialized algorithm or process flow diagram 600 is illustrated in reference to example embodiment shown in FIG. 4. The process flow diagram 600 is executed by a specialized processor or specialized controller 254 based on the inputs received from one or more sensors in operative units 250 and the computer readable instructions stored in memory 252, shown in FIG. 2B. At block 601, controller 254, for example, receives an input from a first sensor such as a depth sensor. This input includes data for an image in a field of view of robot 202. For example, node 402A may generate data for the right side and the bottom right side of the device or robot 202 and transmit the same to controller 254. This input data includes information as to whether an object "X," mark 403, has been detected along its field of view in the matrix 400. Similarly, node 402B may generate data for left side and bottom left side of the device or robot 202 and transmit the same to controller 254.

Next, upon receiving such data from either nodes 402A, 402B, or both, controller 254 at block 602 determines whether the input received from nodes 402A, 402B, includes detection of an object "X," mark 403, in its field of view. If the controller 254 determines that no object "X" is detected based on the input received from nodes 402A, 402B, then the controller 254 outputs a signal to sensor units 264, as noted in block 611. Whereas, if the controller 254 determines that no object "X" is detected based on the input received from nodes 402A, 402B, then the controller 254 determines at block 603 whether the detected object "X" is in the path the device or robot 202 is travelling.

At block 603, the controller 254 determines whether the detected object "X" in a particular pixel or cell 401 is in the path the device or robot 202 is travelling. If the controller 254 determines that the detected object "X" is not in the path the device or robot 202 is travelling, then the controller 254 outputs a signal to the motor sensor to control the movement of the device or robot 202 along the travelled path, as noted in block 611. However, if the controller 254 determines that the detected object "X" is in the path the device or robot 202 is travelling, then the controller 254 outputs a signal to the motor sensor to stop the movement of the device along the travelled path, as noted in block 604. Thereafter, at block 605, the controller 254 associates a timestamp to the pixel where the object is detected and initiates a ticker for that particular timestamp. For example, as noted above, in FIG. 4, the object "X" detected is by Node 402B in the following parts of the matrix 400—row 5, column 2; row 6, columns 2 and 3; row 7, columns 2 and 3; row 8, column 1; and row 9, column 1. Whereas, an object is detected by Node 2A in the following parts of the matrix 400—row 5, column 9; row 6, columns 8 and 9; row 7, columns 8, 9 and 10; row 8, columns 9 and 10; and row 9, column 10. Accordingly, the following timestamps will have their "ticker t" value initiated—$t_{52}$, $t_{59}$, $t_{62}$, $t_{63}$, $t_{68}$, $t_{69}$, $t_{72}$, $t_{73}$, etc. In other words, the pixel or cell 401 that has an object "X" detected by the depth sensor or Nodes 402A, 402B, it will have the timestamps associated with those respective pixels' ticker value initiated.

The timestamp includes a ticker t with an initial value of zero (0). After associating the timestamp to mark 403, ticker t is initiated to increment in value by every second. That is, ticker t may start at zero (0), but upon detection of object "X," the ticker t may increment every second until it reaches a desired threshold value T. The desired threshold value may be for example five (5) seconds, ten (10) seconds, etc. However, the desired threshold value T may be adjusted upwards or downwards as would be appreciated by one skilled in the art. As such, ticker t may go from 0 seconds to 5 seconds or 10 seconds. During this time period when timer t is incrementing, sensory units 264 continue to instruct robot 202 to stop traveling in its path. Alternatively, the ticker value t may decrement instead of increment. That is, it may start at an initial value of five (5) or ten (10) seconds, and decrement to zero (0). Further, it is important to note that each ticker value respective to each pixel 401 is independent of each other. In other words, a ticker value associated to $t_{52}$ as opposed to one associated $t_{59}$ may be different and independent of each other.

It is important to note that each pixel where object "X" is detected may have a unique timestamp associated to it, with it's own unique ticker t. For example, where controller 254 identifies numerous objects in different pixels of matrix 400, each pixel may have a unique timestamp associated thereto. Wherein, each timestamp may have it's own ticker t incrementing independently of ticker t for another timestamp associated with a different pixel where object "X" has been detected. As shown in FIG. 4, there are numerous objects "X" in different pixels in the field of view of nodes 402A, 402B. As such, each pixel where object "X" is detected may have a timestamp attached to it, which is independent of a timestamp attached to a different pixel where another object "X" is detected.

Thereafter, after the ticker t has been initiated, the controller 254 generates an updated cost map of the matrix 400, as noted in block 606, which includes the new timestamp entries and transmit the updated cost map to the motor sensor, for example. The updated cost map includes the overlapping of the timestamp map (with updated time entries) and the positioning map (with updated location of robot 202). The transmission of this updated cost map to the motor sensors may be done every 10-20 times a second, for example. As such, providing the motor sensors with the updated ticker t values corresponding to each pixel or cells 401 where an object "X" is detected.

Still referring to FIG. 6, the controller 254 again determines whether the ticker t for a particular pixel or cell 401 has reached a desired threshold. For example, if being incremented, the controller 254 determines whether the ticker t reached the threshold of five (5) or ten (10) seconds; and alternatively, if being decremented, the controller 254 determines whether the ticker t reached the value of zero (0). If ticker t has not reached desired threshold value T, then ticker t continues to increment, as noted in block 605, until it reaches the desired threshold value T. However, if ticker t has reached desired threshold value T, then controller 254 proceeds to the next step as noted in block 608.

In block 608, controller 254 outputs a signal to the depth sensors or Nodes 402A, 402B to provide an updated input. In other words, controller 254 determines whether object "X" is still present at mark 405 after ticker t has reached desired threshold value T As such, controller 254 outputs signal to the depth sensor or Nodes 402A, 402B to obtain an updated input. At block 609, controller 254 receives another input from nodes 402A, 402B based on the signal outputted by controller 254 in block 608. This input provided by nodes 402A, 402B includes updated information pertaining to the image captured by nodes 402A, 402B with respect to pixels in their respective fields in matrix 400. The updated input includes an updated image of the field of view by nodes 402A, 402B.

Upon receiving the updated information from nodes 402A, 402B, at block 610, controller 254 determines whether the updated information provided by nodes 402A, 402B indicates detection of an object "X." In other words, controller 254 is doing a second check to determine whether object "X" detected previously has either (i) moved, (ii) still present, or (iii) whether a new object "X" has been detected by nodes 402A, 402B. If controller 254 determines that object "X" is still present in field of view of nodes 402A, 402B, or whether a new object "X" has been detected by nodes 402A, 402B, then controller 254 goes back to associating a timestamp to the pixel where object "X" continues to be present, or is newly detected, and outputs a signal to the motor sensors to stop movement of the device along its travelling path, as noted in block 604 (discussed above). However, if controller 254 determines at block 610 that the updated information provided by the depth sensor or nodes 402A, 402B does not include object "X," then controller 254 proceeds forward with outputting a signal to sensory units 264, as noted in block 611. As discussed above, this signal to sensor units 264 controls movement of robot 202, wherein instructing robot 202 to continue on its path.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software may be rendered in any programming language or environment including, for example, C/C++, C #, Fortran, COBOL, MATLAB™, PASCAL, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., BREW), and the like.

As used herein, connection, link, transmission channel, delay line, and/or wireless can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

Methods disclosed herein may be implemented in one or more processing devices (e.g., a digital processor, an analog processor, a digital circuit designed to process information, an analog circuit designed to process information, a state machine, and/or other mechanism for electronically processing information and/or configured to execute computer program modules stored as computer readable instructions). The one or more processing devices may include one or more devices executing some or all of the operations of methods in response to instructions stored electronically on a non-transitory electronic storage medium. The one or more processing devices may include one or more devices configured through hardware, firmware, and/or software to be specifically designed for execution of one or more of the operations of methods herein.

Further, while the server is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

The processor(s) and/or controller(s) implemented and disclosed herein can comprise both computer-implemented instructions executed by a controller and hardcoded logic such that the processing is done faster and more efficiently. This in turn, results in faster decision making by processor and/or controller, thereby achieving the desired result more efficiently and quickly.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A system for maneuvering a device along a path, comprising:
   a memory having computer readable instructions stored thereon; and
   at least one processor configured to execute the computer readable instructions to:
      receive a first signal from a first sensor of one or more sensors upon detection of one or more objects by the first sensor, the one or more objects being in a field of view of the first sensor, each one of the one or more objects corresponding to a respective pixel on a map;
      associate the respective pixel corresponding to each one of the one or more objects with a timestamp, the timestamp including a ticker;
      associate each pixel between the respective pixel and the first sensor with empty space via ray tracing, the first sensor corresponding to a node;
      initiate the ticker for the respective pixel upon receiving the first signal; and
      output a second signal to a second sensor of the one or more sensors after the ticker equals a desired threshold value if the one or more objects are no longer detected by the first sensor, the second signal corresponding to controlling movement of the device along the path;

wherein,
the path begins at a location proximate to a home locator, the home locator is detected by a respective sensor of the robot to provide the robot with an initial location, and the path is learned via a user demonstration, the user demonstration denotes an end location of the path via a user input.

2. The system of claim 1, wherein the at least one processor is further configured to execute the computer readable instructions to:

associate the timestamp with the respective pixel such that a first timestamp associated with a first pixel is different from a second timestamp associated with a second pixel.

3. The system of claim 1, wherein the field of view of the first sensor includes at least one of a right side of the device, a left side of the device, a bottom-right side of the device, and a bottom-left side of the device.

4. The system of claim 1, wherein the second signal is outputted to the second sensor prior to initiating of the ticker if the first sensor does not detect the one or more objects in the field of view of the first sensor.

5. A non-transitory computer readable medium comprising computer readable instructions stored thereon, that when executed by at least one processor, cause the at least one processor to:

receive a first signal from a first sensor of one or more sensors upon detection of one or more objects by the first sensor, the one or more objects being in a field of view of the first sensor, each one of the one or more objects corresponding to a respective pixel on a map;

associate the respective pixel corresponding to each one of the one or more objects with a timestamp, the timestamp including a ticker;

initiate the ticker for the respective pixel upon receiving the first signal;

associate each pixel between the respective pixel and the first sensor with empty space via ray tracing, the first sensor corresponding to a node; and output a second signal to a second sensor of the one or more sensors after the ticker equals a desired threshold value if the one or more objects are no longer detected by the first sensor, the second signal corresponding to controlling movement of the device along the path;

wherein the path begins at a location proximate to a home locator, the home locator is detected by a respective sensor of the robot to provide the robot with an initial location, and the path is learned via a user demonstration, the user demonstration denotes an end location of the path via a user input.

6. The non-transitory computer readable medium of claim 5, wherein the at least one processor is further configured to execute the computer readable instructions to:

associate the timestamp with the respective pixel such that a first timestamp associated with a first pixel is different from a second timestamp associated with a second pixel.

7. The non-transitory computer readable medium of claim 5, wherein the field of view of the first sensor includes at least one of a right side of the device, a left side of the device, a bottom-right side of the device, and a bottom-left side of the device.

8. The non-transitory computer readable medium of claim 5, wherein the second signal is outputted to the second sensor prior to initiating of the ticker if the first sensor does not detect the one or more objects in the field of view of the first sensor.

9. A method of maneuvering a device along a path, comprising:

receiving a first signal from a first sensor of one or more sensors upon detection of one or more objects by the first sensor, the one or more objects being in a field of view of the first sensor, each one of the one or more objects corresponding to a respective pixel on a map;

associating the respective pixel corresponding to each one of the one or more objects with a timestamp, the timestamp including a ticker;

initiating the ticker for the respective pixel upon receiving the first signal;

associate each pixel between the respective pixel and the first sensor with empty space via ray tracing, the first sensor corresponding to a node; and outputting a second signal to a second sensor of the one or more sensors after the ticker equals a desired threshold value if the one or more objects are no longer detected by the first sensor, the second signal corresponding to controlling movement of the device along the path;

wherein the path begins at a location proximate a home locator, the home locator being detected by at least one sensor of the robot to provide the robot with an initial location, and the path is learned via a user demonstration, the user demonstration denotes an end location of the path via a user input.

10. The method of claim 9, further comprising:

associating the timestamp with the respective pixel such that a first timestamp associated with a first pixel is different from a second timestamp associated with a second pixel.

11. The method of claim 9, wherein the second signal is outputted to the second sensor prior to initiating of the ticker if the first sensor does not detect the one or more objects in the field of view of the first sensor.

12. The system of claim 1, wherein the first sensor is either a front facing or backward facing sensor, the backward facing sensor configured to perceive environment behind the device, and the forward facing sensor configured to perceive environment in front of the device.

13. The system of claim 1, wherein the ticker associated with the respective pixel is independent of each other another pixel such that the ticker of each of the respective pixel increments independent of the ether another pixel.

14. The system of claim 1, wherein the map corresponds to a cost map, the cost map comprises a timestamp map and a position map, the timestamp map overlaps on top of the position map, the timestamp map corresponds to time value of each respective ticker associated with the respective pixel, and the position map corresponds to current location of the device.

* * * * *